Figures 1, 2:
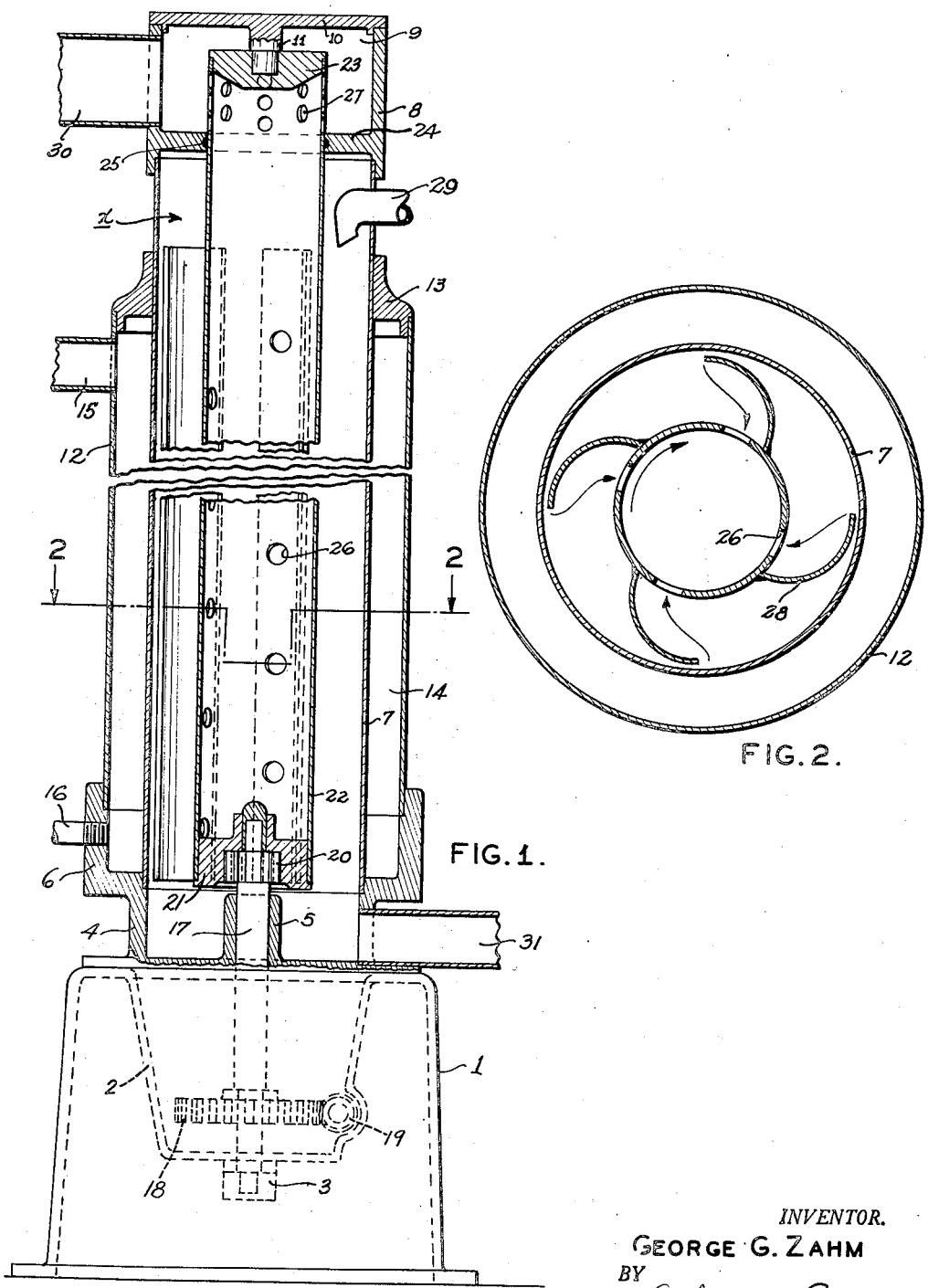

March 27, 1951  G. G. ZAHM  2,546,380
APPARATUS FOR CONCENTRATING LIQUIDS
Filed Jan. 31, 1945

INVENTOR.
GEORGE G. ZAHM
BY
*Alfred W. Petschaft*
ATTORNEY

Patented Mar. 27, 1951

2,546,380

UNITED STATES PATENT OFFICE 2,546,380

APPARATUS FOR CONCENTRATING LIQUIDS

George G. Zahm, Buffalo, N. Y., assignor to Hurd Corporation, New York, N. Y., a corporation of Delaware Application January 31, 1945, Serial No. 575,512

4 Claims. (Cl. 159—6)

This invention relates to certain new and useful improvements in apparatus for concentrating liquids and more particularly liquids containing organic substances which would be impaired if the liquid were subjected to a high temperature for a considerable period of time. Furthermore, this apparatus is designed for treating or concentrating liquids which have a tendency to foam.

The primary object of this invention is to provide apparatus for treating organic solutions and other foaming liquids, such as fruit juices and comestible extracts, whereby the liquid content in the same may be reduced or the liquid is concentrated quickly and economically and without impairing the taste or quality of the remaining constitutents.

It is a further object of the present invention to provide apparatus of the type and for the purposes stated in which entrainment is substantially eliminated.

The above and other objects will become more fully apparent from the following specification which, by way of illustration rather than limitation, sets forth preferred processes and preferred forms of apparatus constituting embodiments of the present invention, the scope of which is defined in the appended claims.

In the accompanying drawings:

Figure 1 is a fragmentary vertical sectional view of a preferred form of apparatus for practicing my invention; and Figure 2 is a horizontal sectional view of the apparatus taken along line 2—2 of Figure 1.

In its general organization the preferred form of apparatus shown in the drawings comprises a preferably cast iron base housing 1 having a central depressed gear box 2 provided in its bottom wall with a step-bearing 3. Welded or otherwise secured upon the upper face of the housing 1 in closure-forming disposition across the top of the gear box 2 is an upstanding base ring 4 having a vertical shaft-bearing 5 axially aligned with the step-bearing 3, and around its upper peripheral margin the base ring 4 is integrally provided with a diametrally enlarged, upwardly extending collar 6. Shrunk or otherwise suitably secured in the base ring 4 and extending upwardly therefrom in concentric relation to the shaft-bearing 5 is a cylindrical column 7 preferably constructed of copper or other suitable material having a high co-efficient of heat conductivity and provided at its upper end with a head 8 having a central upwardly projecting hollow dome 9 preferably of cylindrical form and including a horizontal top wall 10 which is in turn provided with a depending pintle or bearing-stud 11 aligned axially with the shaft bearing 5.

Surrounding the column 7, and fixed at its lower end in the collar 6 is a cylindrical jacket or shell 12, and at its upper end the shell 12 is secured in a closure-collar 13 mounted around the column 7 somewhat below the head 8, thus forming an intervening jacket space 14 which is adapted to receive steam or other heating medium for heating the column 7. The steam or other heating agent is preferably supplied to this jacket-space 14 by means of a steam supply pipe 15 fixed in and extending through the shell 12 adjacent its upper end, the excess steam and water of condensation being withdrawn from the lower end of the jacket-space 14 by a discharge pipe 16 threaded through the collar 6.

Rotatably mounted at its lower end in the step-bearing 3 and projecting upwardly through the bearing 5 is a vertical shaft 17, provided, along the portion of its length within the gear box 2, with suitable driving gears 18, 19, which are conventionally connected to a prime-mover (not shown). At its upper end the shaft 17 is connected by means of a spline-collar 20 to a hub 21 rigidly mounted in the lower end of a cylindrical impeller tube 22 of substantially smaller diametrical size than the column 7 and extending co-axially upwardly therethrough into the dome 9. At its upper end the tube 22 is provided with an end-plate 23 which rotatably engages the bearing-stud 11, and projecting inwardly at the lower end of the dome 9, is an annular horizontal partition-plate 24 centrally bored and provided with a packing-ring 25 for gland-wise engaging the tube 22. Within the column 7 the tube 22 is provided with four equally spaced vertical rows of apertures 26, and above the partition-plate 24, the tube 22 is further provided with a plurality of circumferentially spaced apertures 27, so that the dome 9 communicates directly with the interior of the tube 22, but does not communicate directly with the annular vapor space between the outer face of the tube 22 and the inner face of column 7.

Welded to the outer face of the impeller tube 22 just ahead of each vertical line of apertures 26 (reference being had to the direction of rotation of the impeller tube 22 as shown by the inner arrow in Fig. 2) are impeller blades 28 which curve outwardly and rearwardly in overlying relation to the associated line of apertures 26 terminating in almost tangential relation to the inner face of the column 7, but having a slight amount of clearance, for purposes presently more fully appearing. It should be noted in this connection that the curvature of the blades 28 is not critical and for that matter the blades may have any desired cross-sectional contour, so long as the trailing edge of each blade comes into proximity with the inner face of the column 7 along a line substantially to the rear (with respect to the direction of revolution) of the radial plane passing through the apertures 26 located adjacent to the line of attachment of such blade. Furthermore, the impeller blades 28 are somewhat shorter in vertical length than the column 7 so as to provide a head-space $x$ beneath the partition plate 24, and projecting through the column 7 into this head-space $x$ is a supply-line 29 bent over at its inner end so as to discharge the stream of the incoming liquids against the inner face of the column 7. Finally, the column 7 is provided with a vacuum-line 30 which extends through the head 8 and a discharge line 31 which extends through the base-ring 4, both being connected respectively to conventional high-vacuum pumping equipment and liquid storage or packaging equipment (not shown).

In operation, a stream of liquid is admitted through the supply pipe 29 and permitted to flow down by gravity over the inner face of the column 7 while the latter is externally heated by admission of steam to the jacket-space 14. As the liquid flows downwardly, a centrifugal motion is imparted to it by the impeller blades 28 in the formation of a thin tubular film against the inner face of the column 7.

During its flow from the supply line 29 to the discharge line 31, the stream of liquid is subjected to high vacuum and a substantial portion will pass off as vapor through the apertures 26, as diagrammatically indicated by the outer arrows in Figure 2, the vapor flowing upwardly through the tube 22 and the apertures 27 into the dome 9 and thence into the vacuum-line 30. The clearances between the outer edges of the blades 28 and the face of the column 7 permit portions of the liquid to escape from the influence of the blades and form the thin film extending from the rear side of each blade to the front of the next following blade 28. The liquid forming this thin annular layer is subjected to the rapid evaporating effect of the heated column 7 and highly efficient rapid evaporation will take place with a minimum of foaming and spray-formation. Such foam and spray as may be formed will not be entrained with the vapor because of the unique placement of the apertures 26 and the shape of the blades 28.

Assuming the impeller blades 28 to have a peripheral diameter of fifteen inches and the impeller tube 22 to have a peripheral diameter of eight inches, the radial distance from the outer edge of a blade 28 to the face of the tube 22 will be 3½ and, obviously, the distance to the nearest aperture 26 will be about four inches.

If the impeller tube 22 is rotated at 400 R. P. M., the apertures are moving at a peripheral velocity of about 170 inches per second and, similarly, each blade 28 will make one-fourth of a revolution in $6/160$ second. This means that a droplet of foam, in order to catch up with and pass through the nearest aperture 26, must traverse the four-inch distance in $6/160$ second (i. e. 106 inches per second) and at the same time move in the direction of impeller rotation at a velocity of 170 inches per second. Actually, the droplet's velocity along the path, diagrammatically indicated by one of the outer arrows in Figure 2, will be the resultant of these two velocities or, roughly, 190 inches per second. It will be noted that this is the lowest possible velocity which a droplet can have if it is to catch up with and pass through an aperture 26, and, since foam or spray droplets cannot approach such high velocities, there can be no entrainment. Actually, the droplets travel much slower and are caught in "mid-air," so to speak, by the next succeeding blade 28 which whirls them outwardly to be merged again with the liquid film on the surface of the column 7.

It should be understood that changes and modifications both in the methods, as well as in the form, construction, arrangement, and combination of the several parts, of the apparatus for evaporating or concentrating liquids may be made and substituted for those herein shown and described without departing from the nature and principle of the present invention.

Having thus described my invention, what I claim and desire to secure by Letters Patent is:

1. For use with apparatus for concentrating liquids including a steam-jacketed cylindrical column the improvement comprising a tubular impeller rotatably mounted co-axially within the column, said impeller having a plurality of apertures opening into its interior and a plurality of radially extending blades projecting outwardly and being of arcuate transverse cross-section so as to curve rearwardly with relation to the direction of travel of the impeller so as to overlie the apertures, in radially outwardly spaced relation thereto, said blades further being, at their outer margins, spaced away from the inner face of the column by a relatively small distance so as to spread the liquid being concentrated in a thin film over such inner face.

2. An impeller for use with a steam jacketed cylindrical column, said impeller comprising a tube rotatably mounted co-axially within the column and having a plurality of apertures opening into its interior and a plurality of radially extending blades projecting outwardly and being of arcuate transverse cross-section so as to curve rearwardly with relation to the direction of travel of the impeller so as to overlie the apertures in radially outwardly spaced relation thereto, said blades further being disposed in approximately tangential relation to, but spaced a relatively small distance radially inwardly from, the inwardly presented face of the column uniformly throughout their length.

3. An impeller for use with a cylindrical evaporator column, said impeller comprising a tubular member rotatably mounted in and extending axially through the column, and a plurality of equally spaced outwardly projecting blades secured at their bases to and extending axially along the tubular member and being of arcuate transverse cross-section so as to curve rearwardly with respect to the direction of rotation of the tubular member, said tubular member being provided with an axially extending series of relatively small apertures adjacent to and along the rearward side of each blade, each series of apertures being located wholly within the area between the base of the blade with which such series of apertures is associated and the line of intersection between the tubular member and the radial plane passing through the outer tip of such blade.

4. An impeller for use with a cylindrical evaporator column, said impeller comprising a tubular member rotatably mounted in and extending axially through the column, and a plurality of equally spaced outwardly projecting blades secured at their bases to and extending axially along the tubular member and being of arcuate transverse cross-section so as to curve rearwardly with respect to the direction of rotation of the tubular member, said tubular member being provided with an axially extending series of relatively small apertures located adjacent to each blade forwardly of the outer edge and rearwardly of the base thereof, said blades further being closely tangent to but not touching the inner surface of the column.

GEORGE G. ZAHM.

REFERENCES CITED

The following references are of record in the file of this patent:

UNITED STATES PATENTS

| Number | Name | Date |
| --- | --- | --- |
| 1,190,127 | Disdier | July 4, 1916 |
| 1,318,464 | Schweizer | Oct. 14, 1919 |
| 1,405,085 | Zahm | Jan. 31, 1922 |
| 1,466,579 | Collver | Aug. 28, 1923 |
| 1,732,805 | Yarmet | Oct. 22, 1929 |
| 2,024,299 | Metcalfe-Shaw | Dec. 17, 1935 |
| 2,306,265 | Heald | Dec. 22, 1942 |

FOREIGN PATENTS

| Number | Country | Date |
| --- | --- | --- |
| 195,710 | Great Britain | Dec. 28, 1921 |